US011166410B1

(12) United States Patent
Bonny (10) Patent No.: US 11,166,410 B1
(45) Date of Patent: Nov. 9, 2021

(54) ELECTRIC OFFSET PLANETARY DRIVE

(71) Applicant: Hydro-Gear Limited Partnership, Sullivan, IL (US)

(72) Inventor: Nathan W. Bonny, Shelbyville, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 106 days.

(21) Appl. No.: 16/518,025

(22) Filed: Jul. 22, 2019

Related U.S. Application Data (60) Provisional application No. 62/702,086, filed on Jul. 23, 2018.

(51) Int. Cl.
| | |
|---|---|
| *A01D 34/69* | (2006.01) |
| *F16H 1/28* | (2006.01) |
| *B60L 50/10* | (2019.01) |
| *H02K 7/116* | (2006.01) |
| *F16H 57/02* | (2012.01) |

(Continued)

(52) U.S. Cl.
CPC ............ *A01D 34/69* (2013.01); *B60L 50/10* (2019.02); *F16H 1/28* (2013.01); *H02K 7/116* (2013.01); *A01D 2101/00* (2013.01); *B60B 35/125* (2013.01); *B60B 2340/14* (2013.01); *B60L 2220/46* (2013.01); *F16H 2057/02043* (2013.01)

(58) Field of Classification Search
CPC ...... A01D 34/69; A01D 2101/00; F16H 1/28; F16H 2057/02043; F16H 2057/02056; B60L 2220/46; B60L 50/10; B60B 2340/14; B60B 35/125; B60K 17/046; H02K 7/116

See application file for complete search history.

(56) References Cited

U.S. PATENT DOCUMENTS

| | | | |
|---|---|---|---|
| 1,786,158 | A | 12/1930 | Hawes |
| 3,717,049 | A | 2/1973 | Brandt |

(Continued)

FOREIGN PATENT DOCUMENTS

| | | |
|---|---|---|
| DE | 102011050571 | 10/2012 |
| EP | 3285377 | 2/2018 |

OTHER PUBLICATIONS

Bonfiglioli 605WE Wheel Drive Series with Electric Motor, Information Sheet, May 18, 2018, 1 p.

(Continued)

*Primary Examiner* — David R Morris
*Assistant Examiner* — Lori Wu
(74) *Attorney, Agent, or Firm* — Neal, Gerber & Eisenberg LLP (57) ABSTRACT

A reduction drive including an electric motor disposed in a housing and driving a motor shaft, a Hall Effect sensor adjacent to the motor, a power and control module, and a pinion gear in the housing and driven by the motor shaft. A planetary gear reduction assembly includes a first ring gear rotatably disposed in the housing and driven by the pinion gear, a sun gear engaged to and driven by the first ring gear, a second ring gear non-rotatably fixed to a housing surface, and a plurality of planet gears mounted on a carrier assembly, each planet gear rotating with the sun gear, and on the second ring gear. An output axle is driven by the carrier assembly and has an axis of rotation that is offset from and parallel to the motor shaft axis of rotation.

20 Claims, 10 Drawing Sheets

(51) Int. Cl.
*A01D 101/00* (2006.01)
*B60B 35/12* (2006.01)

(56) References Cited

U.S. PATENT DOCUMENTS

| | | | | |
|---|---|---|---|---|
| 4,554,989 | A | * | 11/1985 | Gruich .................... B64C 27/12 |
| | | | | 180/65.245 |
| 5,593,360 | A | | 1/1997 | Ishida et al. |
| 6,852,061 | B2 | | 2/2005 | Schoon |
| 7,100,722 | B2 | | 9/2006 | Bowen |
| 8,133,143 | B2 | | 3/2012 | Schoon |
| 8,323,143 | B2 | | 12/2012 | Schoon |
| 8,449,424 | B2 | | 5/2013 | Schoon |
| 9,821,650 | B2 | | 11/2017 | Falls et al. |
| 2006/0180366 | A1 | * | 8/2006 | Brill ..................... B60K 17/046 |
| | | | | 180/65.6 |
| 2012/0248850 | A1 | * | 10/2012 | Hirano .................... F16D 65/12 |
| | | | | 301/6.5 |

OTHER PUBLICATIONS

E-Trac Drive Systems, Manual, AuburnGear, Jun. 2017, 10 pp.
Oerlikon Fairfield, Brochure, "Introducing the new E01H Electric Drive Solution," Date unknown but believed to be at least as early as Jun. 29, 2018, 6 pp.
Oerlikon Fairfield, Media Release, "Oerlikon Fairfield Assigned Patent for Development of Electric Wheel Drive," Feb. 15, 2013, 2 pp.
Heinzmann, Perm Technology, Electric Drives Product Catalog, Jan. 2016, 56 pp.
Rexroth, a Bosch Company, Press Release, "Emission-free mobility: Rexroth unveils drive for high-mileage electric vehicles," Jan. 28, 2019, 3 pp.
U.S. Appl. No. 16/457,243, filed Jun. 28, 2019, 29 pp.

* cited by examiner

ELECTRIC OFFSET PLANETARY DRIVE

CROSS REFERENCE

This application claims the benefit of U.S. Provisional Pat. App. No. 62/702,086, filed on Jul. 23, 2018. The contents of this prior application are incorporated herein by reference in their entirety.

BACKGROUND OF THE INVENTION

This application relates to an electric planetary reduction drive incorporating an electric motor and reduction gearing. Such a drive may be used for applications such as a ground drive for a lawn mower, utility vehicle or the like, although other applications are possible.

SUMMARY OF THE INVENTION

A CAN Bus-enabled, electrically-powered, offset planetary reduction drive having a protected, integrated power and control module is disclosed herein. This design provides a relatively compact envelope for use with an electric or hybrid drive lawn mower or other utility vehicle. A versatile mounting interface is provided so that this electric drive can be oriented as needed to protect power and control conductors.

A better understanding of the invention will be obtained from the following detailed descriptions and accompanying drawings, which set forth illustrative embodiments that are indicative of the various ways in which the principals of the invention may be employed.

DETAILED DESCRIPTION OF THE DRAWINGS

The description that follows describes, illustrates and exemplifies one or more embodiments of the invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a more clear description. Additionally, the drawings set forth herein are not necessarily drawn to scale, do not necessarily indicate assembly sequence, and in some instances proportions may have been exaggerated to more clearly depict certain features. As stated above, this specification is intended to be taken as a whole and interpreted in accordance with the principles of the invention as taught herein and understood by one of ordinary skill in the art.

Figure 8:
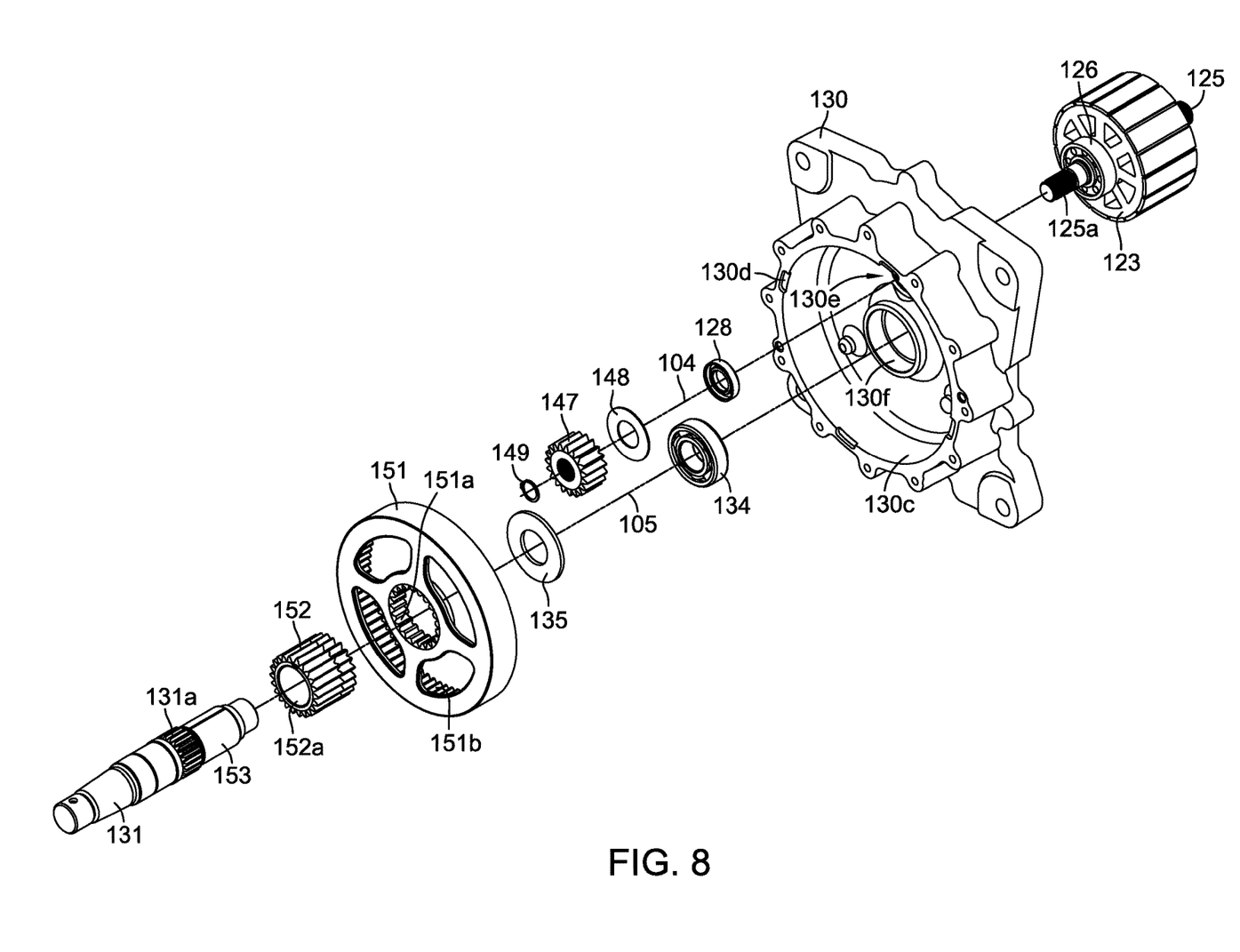
FIG. 8 is a final partially exploded view of selected components of the planetary reduction drive of FIG. 1.
Figure 9:
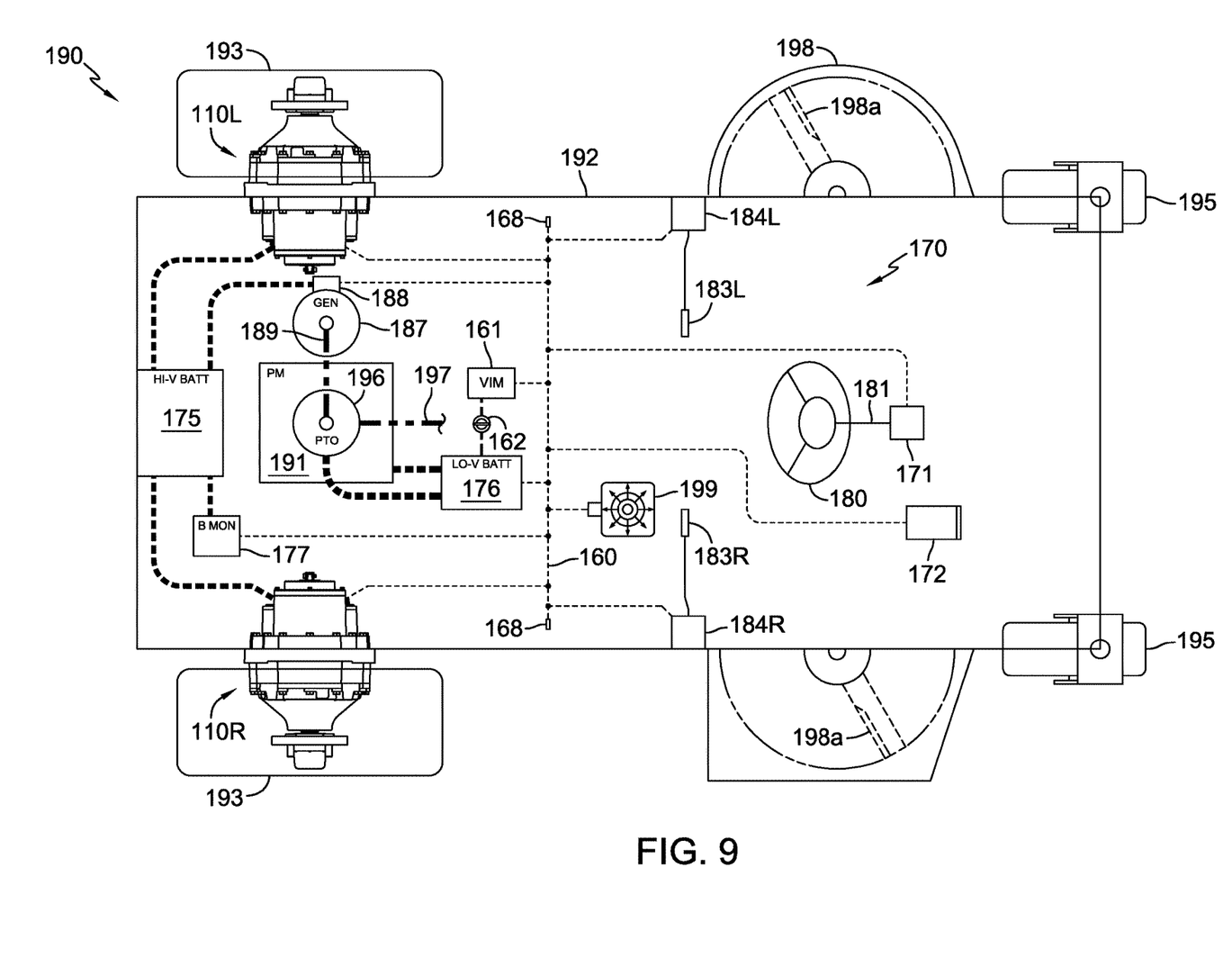
FIG. 9 is a partially schematic view of a hybrid drive vehicle incorporating the electric offset planetary reduction drive disclosed herein.
Figure 10:
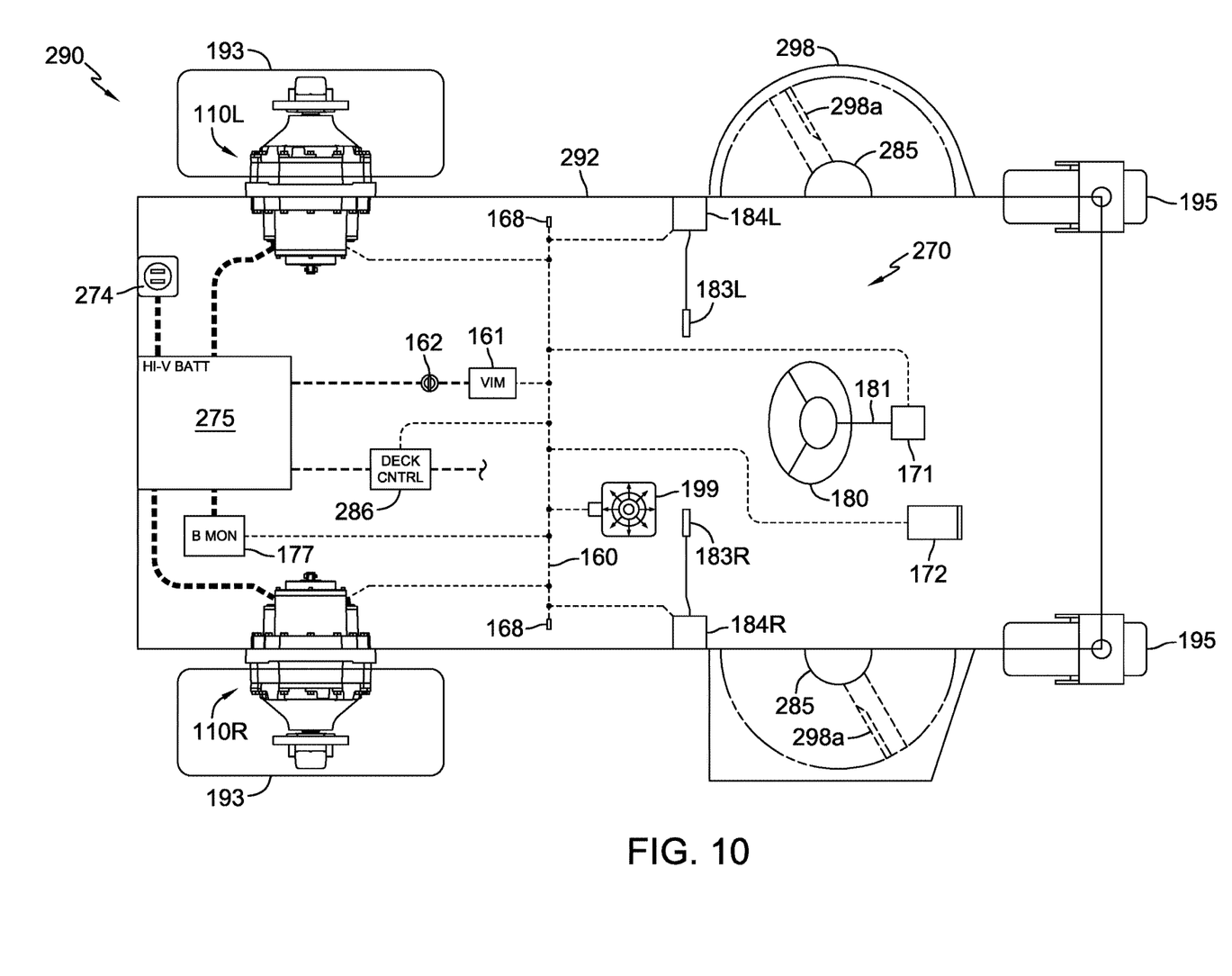
FIG. 10 is a partially schematic view of an electric drive vehicle incorporating the electric offset planetary reduction drive disclosed herein.

An electric planetary reduction drive 110 is depicted in FIGS. 1-8, and two different vehicle applications for electric drive 110 are shown in FIGS. 9 and 10. Electric planetary reduction drive 110 includes a housing comprising a motor housing 120 and an axle housing 140 attached to opposite sides of a center housing 130 by means of fasteners 117, 118. Four mounting thru-holes 130g are arranged in a square pattern centered about the rotational axis of axle 131 such that electric drive 110 may be mounted on a bolt circle pattern oriented as needed for a particular vehicle configuration. That is, the mating bolt circle of a vehicle frame mounting interface can be oriented to any desired position about the axle rotational axis. This allows positioning of the mounted electric drive 110 such that power and control/communication conductors that are routed and attached to electric drive 110 may be better protected. The center housing 130 mounting structure may be positioned to either side of a mating vehicle frame mounting structure for additional versatility in vehicle configuration. A wheel hub 141 is driven by axle 131 to provide the ultimate output of reduction drive 110. Wheel hub 141 incorporates a hub cap 143 covering axle nut and cotter pin 145.

Figure 1:
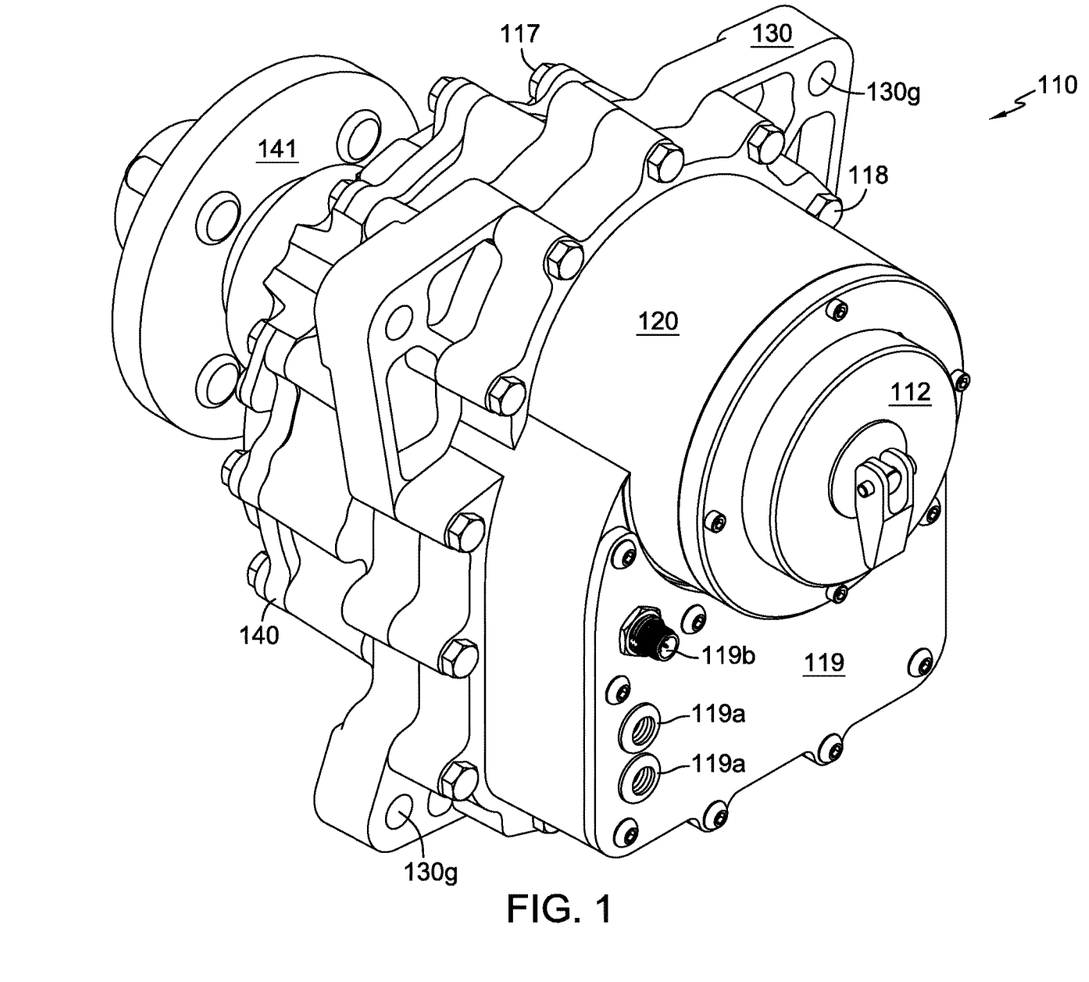
FIG. 1 is an external perspective view of an electric offset planetary reduction drive in accordance with the disclosure herein.
Figure 2:
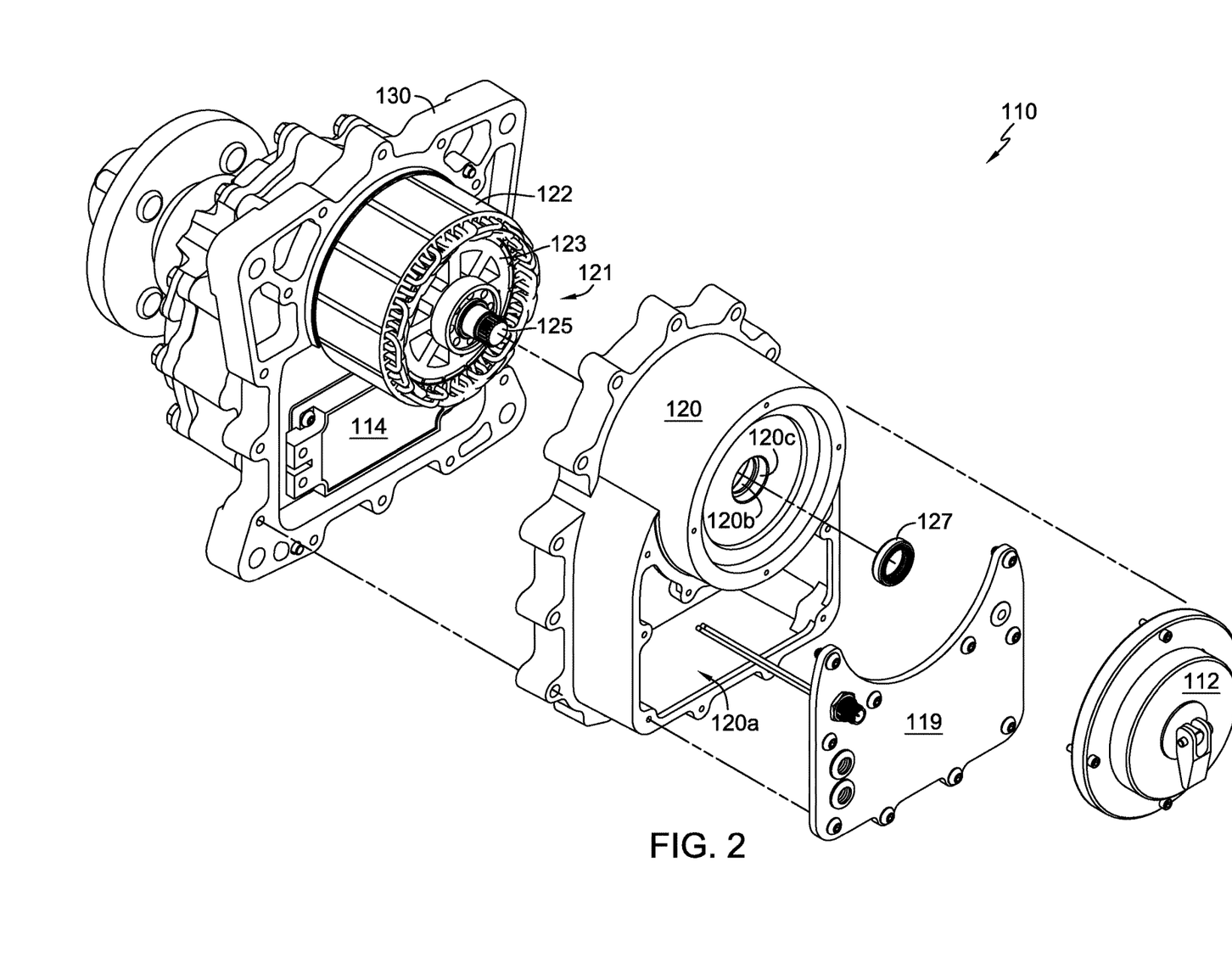
FIG. 2 is a partially exploded view of the electric motor components of the reduction drive of FIG. 1.
Figure 3:
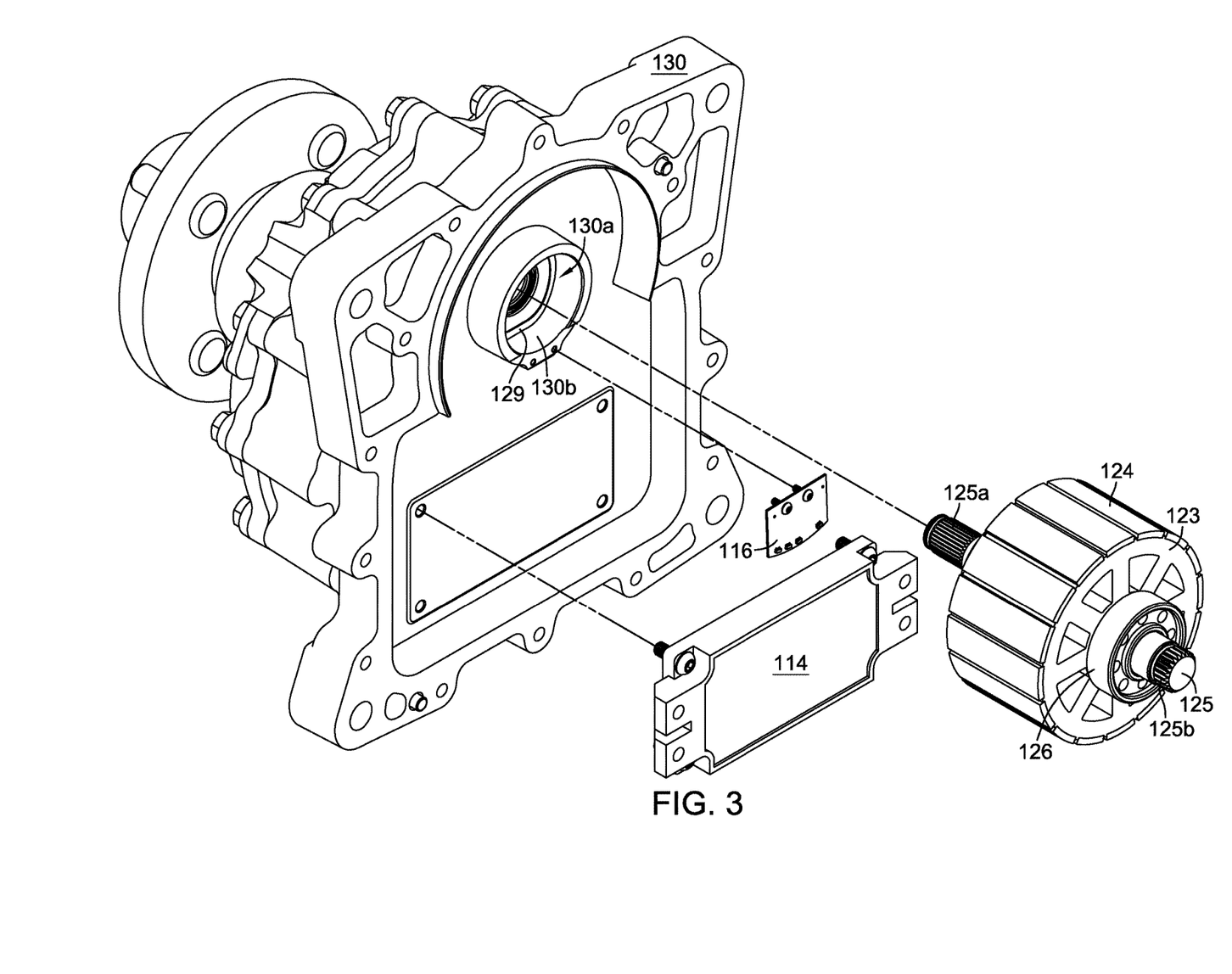
FIG. 3 is a partially exploded view of selected components of the reduction drive of FIG. 1.
Figure 4:
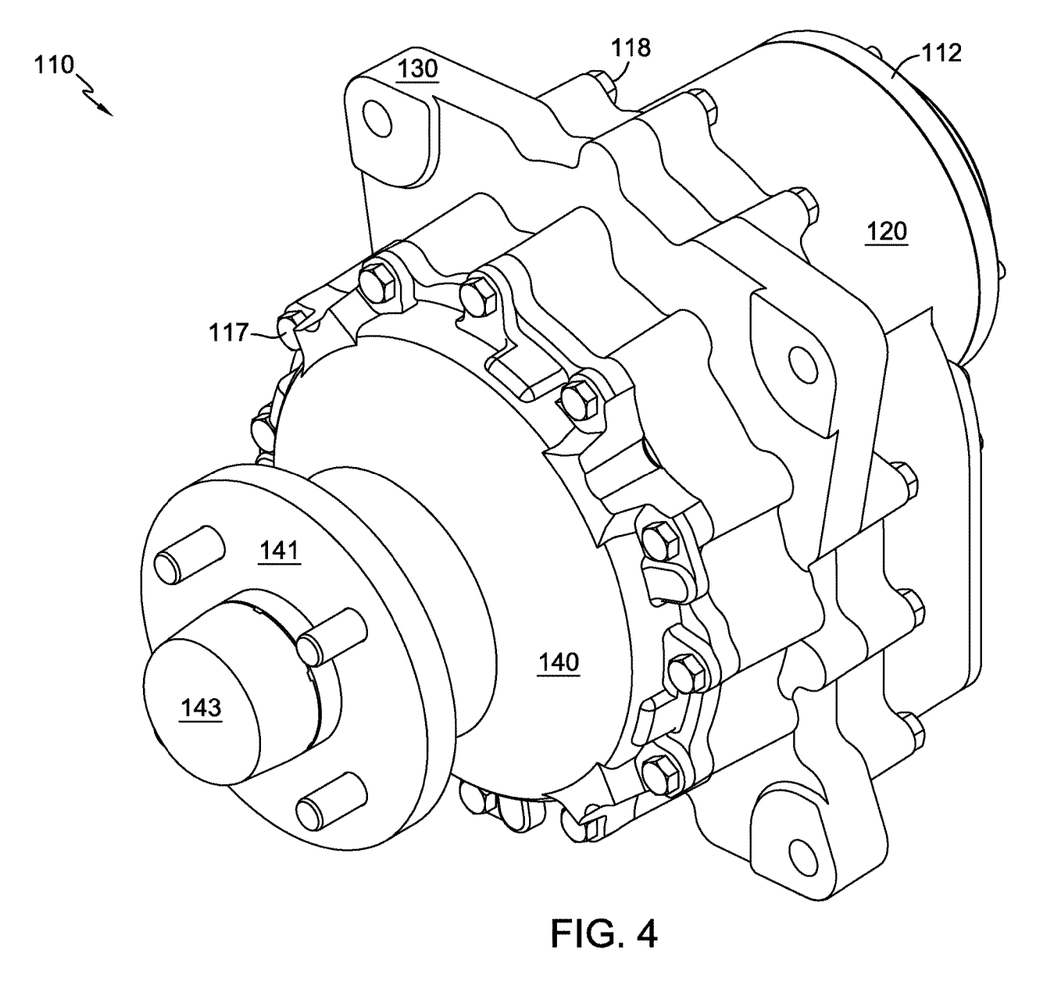
FIG. 4 is another external perspective view of the electric offset planetary reduction drive of FIG. 1.
Figure 5:
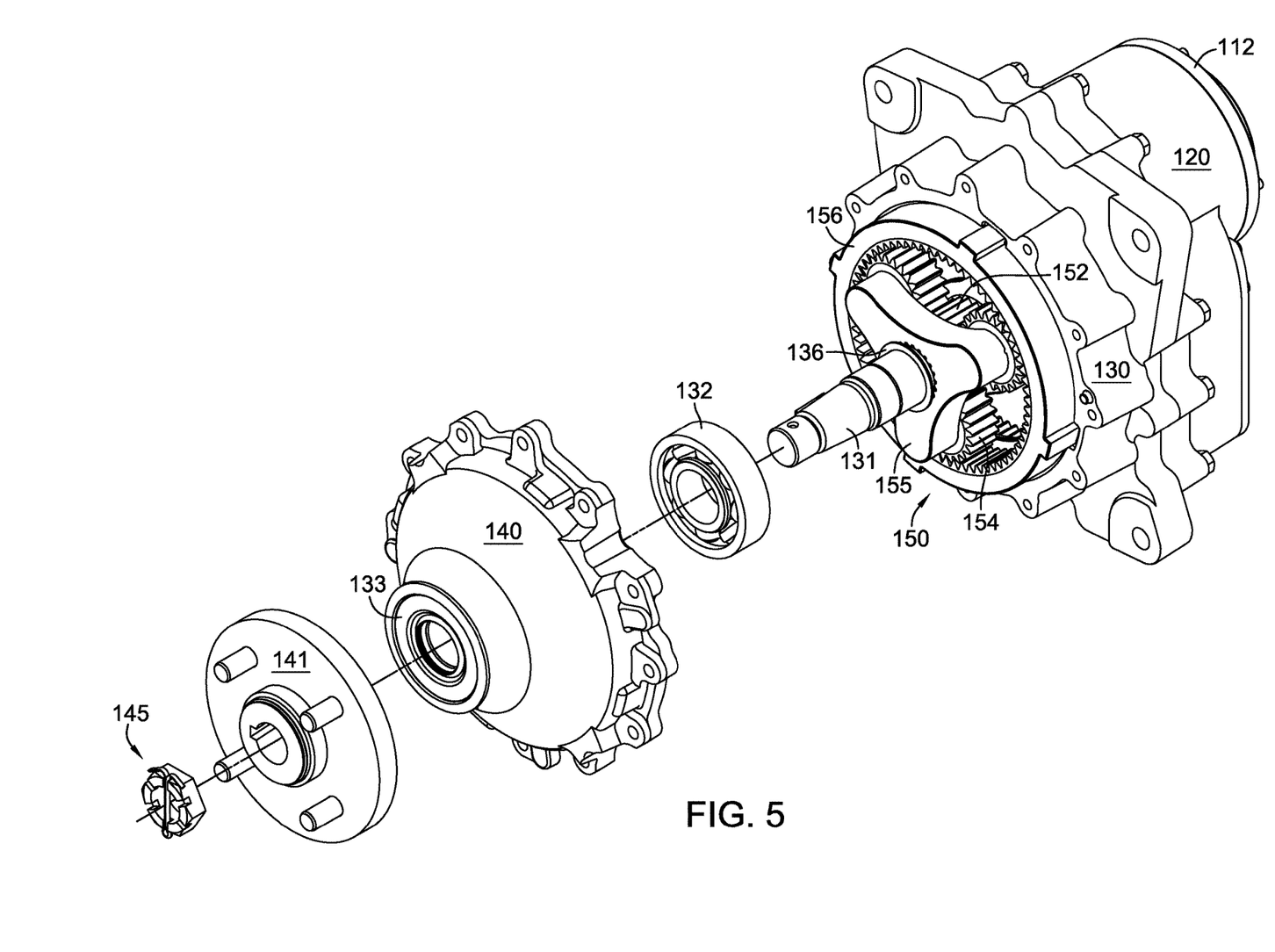
FIG. 5 is a partially exploded view of selected drive components of the planetary reduction drive of FIG. 1.

As shown most clearly in the exploded views of FIGS. 2, 3 and 8, a brushless electric motor 121 is disposed in motor housing 120, and comprises stator 122 (which is pre-installed in housing 120 during assembly), rotor 123 and magnets 124. Hall effect sensor board 116 is located adjacent to bearing pocket 130b (for one of a pair of sealed bearings 126) through which motor output shaft 125 is supported. A CAN Bus-enabled power and control module 114 is shown mounted to a surface of center housing 130. Power and control module 114 provides electrical power to electric motor 121 and controls electric motor 121 as communicated via CAN Bus network. Motor housing 120 provides an access chamber 120a that protects certain electrical components such as power and signal conductors. Chamber 120a extends entirely through motor housing 120, extending from a proximal side of the motor housing 120 that is secured to center housing 130, to a distal side of motor housing 120. A motor housing electrical access cover 119 is secured to this distal side of motor housing 120 to close chamber 120a, and power terminals 119a and CAN Bus connecter 119b are provided thereon. Thus, this housing design provides easy access to power and control module 114 without the need for a more complete disassembly of the unit.

The output shaft 125 extends through electric motor 121 and is supported on each end of the rotor 123 by a bearing 126, one of which is disposed in bearing pocket 130*b* in center housing 130 and the other of which is disposed in bearing pocket 120*b* in motor housing 120. A spring-biased electric brake 112 is attached externally to the distal side of motor housing 120 and is engaged to splines 125*b* of motor output shaft 125. Seal 127 is seated in seal pocket 120*c* in motor housing 120 and isolates brake 112 from electric motor 121 to prevent contamination of electric motor 121.

Center housing 130 includes a through opening 130*a* for output shaft 125, and seal 128 is provided in seal pocket 130*e* to isolate electric motor 121 from planetary reduction assembly 150 which preferably runs in oil. Splines 125*a* are provided on output shaft 125 to engage the pinion gear 147 that drives the planetary reduction assembly 150 as discussed below. Wave spring 129 is disposed between a bearing 126 and center housing 130 to provide an axial biasing force to the rotor 123. In the embodiment depicted, this axial biasing force is provided through bearing 126.

As shown most clearly in the exploded views of FIGS. 5-8, a two stage planetary reduction assembly 150 is provided, incorporating a rotatable first stage ring gear 151 and a fixed second stage ring gear 156. As will be noted, motor output shaft 125 has a first axis of rotation 104, and axle 131 has a second axis of rotation 105 that is parallel to and offset from the first axis of rotation 104. More specifically, motor output shaft 125 drives a pinion gear 147 disposed inside center housing 130. Pinion gear 147 is engaged to and drives the rotatable first stage ring gear 151 by means of gear form 151*b*. Washer 148 and retaining ring 149 may be incorporated to assist in mounting and locating the pinion gear 147. Washer 148 reduces wear at the interface between pinion gear 147 and the center housing 130. Ring gear 151 is disposed in a rotation pocket 130*c* formed in center housing 130 and is engaged to and rotates the sun gear 152 by means of gear form 151*a*. It will be seen in this embodiment that the drive train arrangement of reduction drive 110 is substantially symmetrical about a plane formed by axes of rotation 104, 105.

Figure 6:
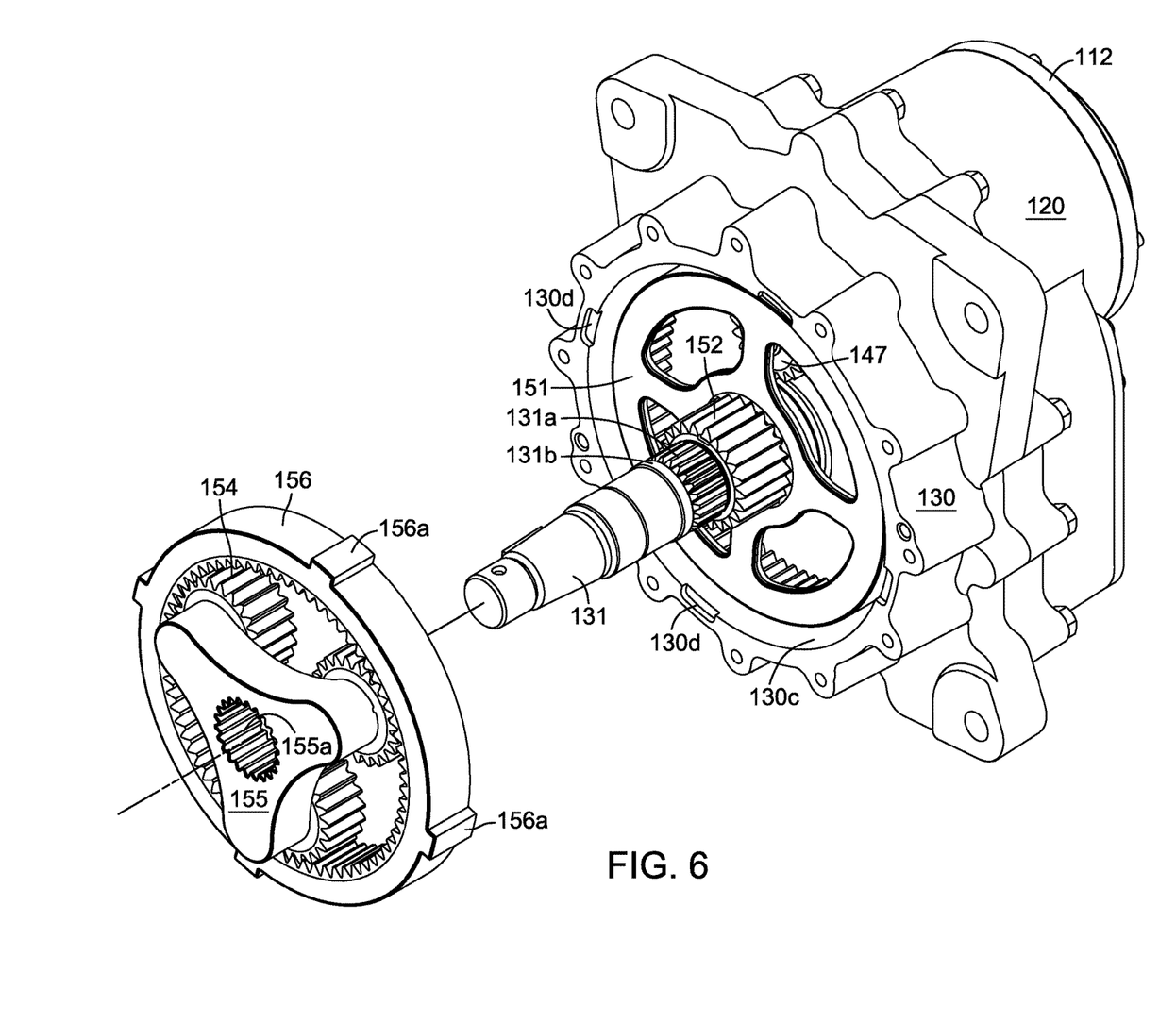
FIG. 6 is a further partially exploded view of selected components of the planetary reduction drive of FIG. 1.
Figure 7:
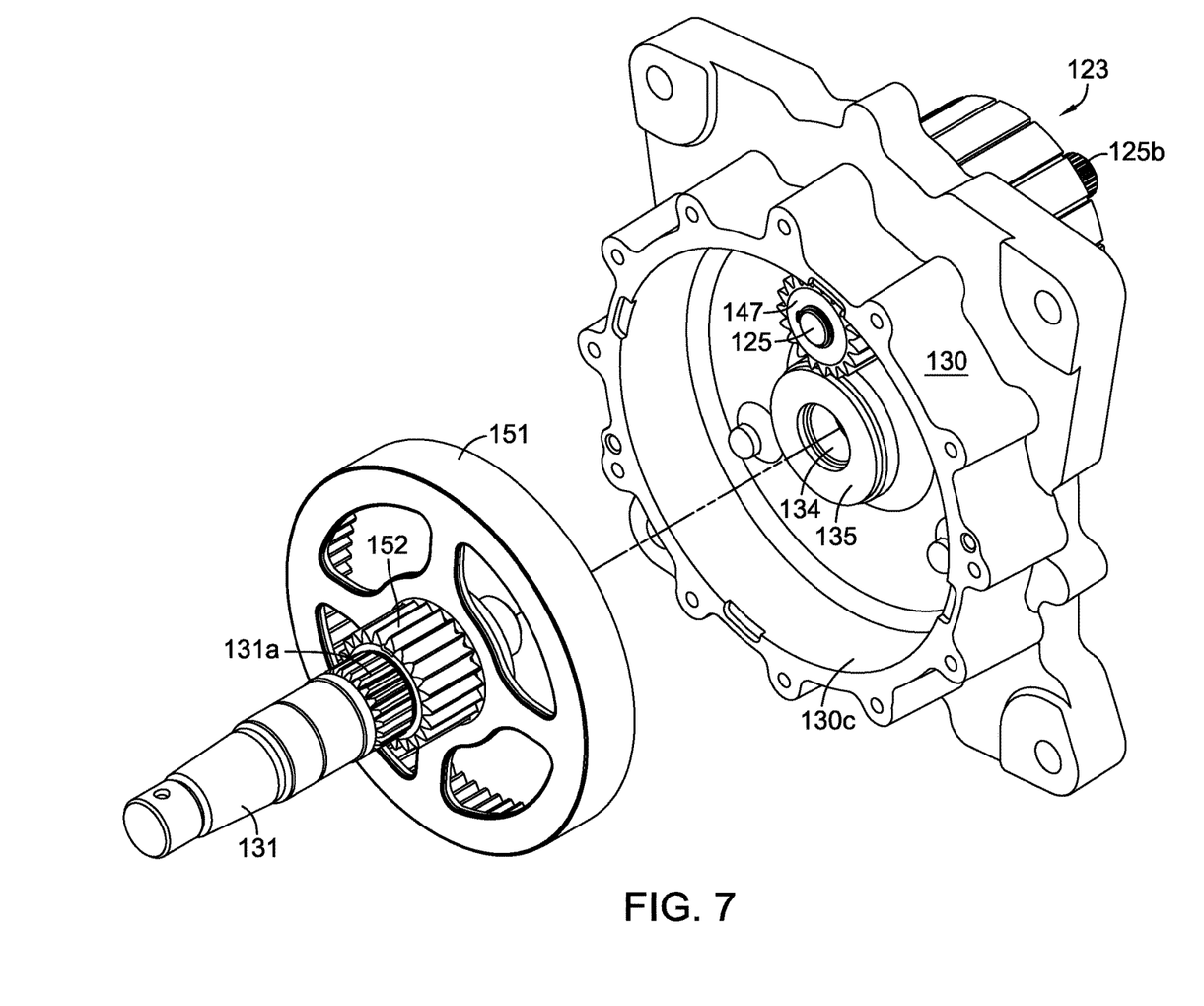
FIG. 7 is a still further partially exploded view of selected drive components of the planetary reduction drive of FIG. 1.

As seen in, e.g., FIG. 6, the second stage reduction of reduction drive 110 includes second stage ring gear 156 and a plurality of planetary gears 154 mounted on planet carrier 155 by means of pins (not shown). The planetary gears 154 are driven by sun gear 152, thus rotating the planet carrier 155 with respect to second stage ring gear 156, which is fixed in axle housing 140 by means of anti-rotation tabs 156*a* engaged to anti-rotation recesses 130*d* of center housing 130. Splines 155*a* of planet carrier 155 are engaged to output axle splines 131*a* to provide a rotational force to axle 131.

Axle 131 includes a journal bearing 153 which extends into through-bore 152*a* of sun gear 152 such that axle 131 can freely rotate with respect to sun gear 152. Journal bearing 153 is press-fit into sun gear 152 to reduce wear against axle 131 and to allow planetary reduction assembly 150 to run in a lower volume of oil. Bearing 134 is press-fit onto axle 131 and, in combination with an integrally formed gear retention ring 131*b* formed on axle 131, retains the entire gear train (except pinion gear 147) to form a subassembly. This pre-assembled arrangement of axle and gear train components facilitates and improves the subsequent assembly process. At assembly, bearing 134 is disposed in bearing pocket 130*f* shown in FIG. 8 (in the position indicated in FIG. 7) and is used to support axle 131, and spacer 135 assists in locating the ring gear 151. Seal 133 is disposed adjacent axle bearing 132, which abuts axle thrust washer 136, which in turn abuts the gear retention ring 131*b*.

FIG. 9 depicts a hybrid zero-turn vehicle 190 incorporating a frame 192, a pair of electric drives 110L, 110R each driving a respective driven wheel 193 and a pair of caster wheels 195. A prime mover 191 (depicted as an internal combustion engine) is disposed on vehicle 190 and powers power take-off clutch/brake 196 to drive a power transfer assembly 197 (represented here as a belt and pulley assembly) to power blades 198*a* on mowing deck 198. Generator 187 is also connected to prime mover 191 by means of power transfer assembly 189 (shown here as a belt and pulley assembly) and controlled by generator controller 188. It should be noted that generator 187 may optionally be directly driven by an output shaft of prime mover 191. A high voltage battery 175 (e.g., 48V) is engaged to generator 187 and provides power to both drives 110L, 110R.

A control system 170 incorporating different means of controlling and steering the vehicle 190 is depicted in this FIG. 9 and it will be understood that one or more of the depicted systems may not be present, and that the drive assemblies 110 and related components of vehicle 190 shown herein can also be used in an autonomous vehicle. Specifically, this embodiment shows a joystick 199, a steering wheel 180 connected by means of a steering shaft 181 to a steering position sensor 171, and a pair of control levers 183L, 183R each connected to a respective control mechanism 184L, 184R incorporating position sensors and return to neutral mechanisms. A pedal 172 for speed and/or directional control is shown for use if the steering wheel 180 is used. In each case, the steering/control mechanisms are connected to a CAN Bus network 160 incorporating termination modules 168. A vehicle integration module 161 is also connected to network 160. Similar systems are depicted in commonly owned U.S. Pat. No. 10,058,031, the terms of which are incorporated herein by reference. A low voltage battery 176 (e.g. 12V) with a key switch 162 may also be connected to network 160 and to prime mover 191 and clutch/brake 196 for starting/stopping purposes. An optional battery monitor 177 may also be connected to network 160 and high voltage battery 175, although monitor 177 could also be wired directly to vehicle integration module 161.

FIG. 10 depicts a fully electric zero turn vehicle 290 which is similar in many respects to vehicle 190. Vehicle 190 incorporates a frame 292, a pair of electric drives 110L, 110R each driving a respective driven wheel 193 and a pair of caster wheels 195. A high voltage battery 275 (e.g., 48V) provides power to both drives 110L, 110R and is connected to a charge receptacle 274. Blades 298*a* of mower deck 298 are powered by electric deck motors 285 connected to and controlled by deck controller 286.

As before, a control system 270 incorporating different means of controlling and steering the vehicle 290 is depicted in this FIG. 10 and it will be understood that one or more of the depicted systems may not be present, and that the drive assembly 110 and related components of vehicle 290 shown herein can also be used in an autonomous vehicle. For this embodiment, elements that may be identical to those described above are shown with identical numerals, whereas those elements that may be modified or connected differently are depicted with similar numerals but using a different prefix (e.g., battery 175 and battery 275).

This embodiment also depicts a joystick 199, a steering wheel 180 connected by means of a steering shaft 181 to a steering position sensor 171, and a pair of control levers 183L, 183R each connected to a respective control mechanism 184L, 184R incorporating position sensors and return to neutral mechanisms. A pedal 172 for speed and/or directional control is shown for use if the steering wheel 180 is used. In each case, the steering/control mechanisms are connected to a CAN Bus network 160 incorporating termination modules 168. A vehicle integration module 161 is also connected to battery 275 and network 160, along with a key switch 162. Deck controller 286 may optionally be an analog device and wired directly to vehicle integration module 161. An optional battery monitor 177 may also be connected to network 160 and high voltage battery 275, although monitor 177 could also be wired directly to vehicle integration module 161.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A reduction drive assembly, comprising:
   a housing assembly comprising a center housing having a first side and a second side opposite the first side, a motor housing secured to the first side of the center housing and an axle housing secured to the second side of the center housing;
   an electric motor disposed in the motor housing and driving a motor output shaft having a first axis of rotation;
   a pinion gear disposed in the center housing and engaged to and driven by the motor output shaft;
   a planetary gear reduction assembly disposed within a portion of the axle housing and a portion of the center housing, the planetary gear reduction assembly comprising:
      a first ring gear rotatably disposed in the center housing, the first ring gear being engaged to and driven by the pinion gear;
      a sun gear engaged to and driven by the first ring gear;
      a second ring gear being non-rotatably fixed to a surface of the center housing;
      a carrier assembly having a splined center opening;
      a plurality of planet gears mounted on the carrier assembly, wherein each of the plurality of planet gears are engaged to and rotated with the sun gear, and each of the plurality of planet gears rotate on the second ring gear; and
   an output axle driven by the carrier assembly, the output axle having a second axis of rotation that is offset from and parallel to the first axis of rotation.

2. The reduction drive assembly of claim 1, further comprising a power and control module mounted to a second surface of the center housing.

3. The reduction drive assembly of claim 2, wherein the motor housing comprises a proximal side engaged to the first side of the center housing, and a distal side, and an access chamber extending entirely through the motor housing from the distal side to the proximal side, whereby the power and control module is accessible from the distal side of the motor housing.

4. The reduction drive assembly of claim 3, further comprising a cover engaged to the distal side of the motor housing to close the access chamber.

5. The reduction drive assembly of claim 1, further comprising a bearing pocket on the first side of the center housing, wherein the motor output shaft is supported on a bearing disposed in the bearing pocket.

6. The reduction drive assembly of claim 5, further comprising a Hall Effect sensor connected to a portion of the bearing pocket and disposed adjacent to a rotor of the electric motor.

7. The reduction drive assembly of claim 6, further comprising a wave spring disposed in the bearing pocket and applying an axial biasing force to the rotor of the electric motor.

8. The reduction drive assembly of claim 6, further comprising a power and control module mounted to a second surface of the center housing, wherein the motor housing comprises a proximal side engaged to the first side of the center housing, and a distal side, and an access chamber extending entirely through the motor housing from the distal side to the proximal side, whereby the power and control module is accessible from the distal side of the motor housing.

9. The reduction drive assembly of claim 8, further comprising a cover engaged to the distal side of the motor housing to close the access chamber.

10. The reduction drive assembly of claim 9, further comprising an electric brake attached to the distal side of the motor housing and engaged to the motor output shaft.

11. The reduction drive assembly of claim 1, wherein the reduction drive assembly is substantially symmetrical about a plane passing through the first axis of rotation and the second axis of rotation.

12. A reduction drive assembly, comprising:
    an electric motor disposed in a housing and comprising a rotor, the electric motor driving a motor output shaft having a first axis of rotation;
    a bearing pocket formed on a portion of the housing, wherein the motor output shaft is supported on a bearing disposed in the bearing pocket;
    a Hall Effect sensor connected to a portion of the bearing pocket and disposed adjacent to the rotor;
    a power and control module disposed in the housing;
    a pinion gear disposed in the housing and engaged to and driven by the motor output shaft;
    a planetary gear reduction assembly disposed within the housing and comprising:
       a first ring gear rotatably disposed in the housing, the first ring gear being engaged to and driven by the pinion gear;
       a sun gear engaged to and driven by the first ring gear;
       a second ring gear being non-rotatably fixed to a surface of the housing;
       a carrier assembly having a splined center opening;
       a plurality of planet gears mounted on the carrier assembly, wherein each of the plurality of planet gears are engaged to and rotated with the sun gear, and each of the plurality of planet gears rotate on the second ring gear; and
    an output axle driven by the carrier assembly, the output axle having a second axis of rotation that is offset from and parallel to the first axis of rotation.

13. The reduction drive assembly of claim 12, further comprising a wave spring disposed in the bearing pocket and applying an axial biasing force to the rotor of the electric motor.

14. The reduction drive assembly of claim 12, wherein the housing comprises a separate motor housing component having an access chamber extending entirely therethrough, whereby the power and control module is accessible from outside the housing through the access chamber, and wherein the electric motor is disposed in the separate motor housing component.

15. The reduction drive assembly of claim 14, further comprising an electric brake attached to the separate motor housing component and engaged to the motor output shaft.

16. The reduction drive assembly of claim 12, wherein the reduction drive assembly is substantially symmetrical about a plane passing through the first axis of rotation and the second axis of rotation.

17. A vehicle having a pair of driven wheels, the vehicle comprising:
- an operator control system disposed on the vehicle and connected to a network;
- a pair of drive motor assemblies disposed on the vehicle, each drive motor assembly connected to the network and comprising:
  - an electric motor disposed in a housing and comprising a rotor, the electric motor driving a motor output shaft having a first axis of rotation;
  - a bearing pocket formed on a portion of the housing, wherein the motor output shaft is supported on a bearing disposed in the bearing pocket;
  - a Hall Effect sensor connected to a portion of the bearing pocket and disposed adjacent to the rotor;
  - a power and control module disposed in the housing;
  - a pinion gear disposed in the housing and engaged to and driven by the motor output shaft;
  - a planetary gear reduction assembly disposed within the housing and comprising:
    - a first ring gear rotatably disposed in the housing, the first ring gear being engaged to and driven by the pinion gear;
    - a sun gear engaged to and driven by the first ring gear;
    - a second ring gear being non-rotatably fixed to a surface of the housing;
    - a carrier assembly having a splined center opening;
    - a plurality of planet gears mounted on the carrier assembly, wherein each of the plurality of planet gears are engaged to and rotated with the sun gear, and each of the plurality of planet gears rotate on the second ring gear; and
  - an output axle driven by the carrier assembly, the output axle having a second axis of rotation that is offset from and parallel to the first axis of rotation, wherein the output axle is engaged to and drives one of the pair of driven wheels of the vehicle.

18. The vehicle of claim 17, wherein the housing of each of the pair of drive motor assemblies comprises a center housing having a first side and a second side opposite the first side, a motor housing secured to the first side of the center housing and an axle housing secured to the second side of the center housing.

19. The vehicle of claim 18, wherein the motor housing comprises a proximal side engaged to the first side of the center housing, and a distal side, and an access chamber extending entirely through the motor housing from the distal side to the proximal side, whereby the power and control module is accessible from the distal side of the motor housing.

20. The vehicle of claim 19, further comprising a cover engaged to the distal side of the motor housing to close the access chamber.

* * * * *